United States Patent [19]

Takamura

[11] Patent Number: 4,741,606
[45] Date of Patent: May 3, 1988

[54] OBJECTIVE LENS SYSTEM FOR OPTICAL RECORDING AND READING DEVICE

[75] Inventor: Sachiko Takamura, Kyoto, Japan

[73] Assignee: Minolta Camera Kabushiki Kaisha, Osaka, Japan

[21] Appl. No.: 894,636

[22] Filed: Aug. 8, 1986

[30] Foreign Application Priority Data

Aug. 19, 1985 [JP] Japan .................................. 60-182320

[51] Int. Cl.$^4$ .......................... G02B 13/18; G02B 9/12
[52] U.S. Cl. ...................................... 350/432; 350/478
[58] Field of Search ............................... 350/432–435, 350/478

[56] References Cited

U.S. PATENT DOCUMENTS

| | | | |
|---|---|---|---|
| 3,877,792 | 4/1975 | Cox et al. | 350/432 |
| 4,525,824 | 6/1985 | Hatano et al. | 369/45 |
| 4,645,311 | 2/1987 | Rothe | 350/432 |

FOREIGN PATENT DOCUMENTS

| | | |
|---|---|---|
| 57-154213 | 9/1982 | Japan . |
| 58-211729 | 12/1983 | Japan . |
| 59-157607 | 9/1984 | Japan . |
| 2121210A | 5/1983 | United Kingdom . |

OTHER PUBLICATIONS

Kuttner, Paul, "Optical Systems for Optical Disk Technology".

Kuttner, Paul, "Design and Testing of Lenses for Optical Disk Technology".

Primary Examiner—John K. Corbin
Assistant Examiner—Scott J. Sugarman
Attorney, Agent, or Firm—Price, Gess & Ubell

[57] ABSTRACT

The present invention provides an objective lens system specifically designed for optically recording and reading digital data on an optical disc. The lens system includes three lenses, with one of the lenses having an aspherical surface. The first lens element can have a positive power with a spherical surface on its light source side. The second lens element can have a positive refractive power while a third lens element can also have a positive refractive power. The lens system can fulfill the following conditions.

$$-0.3 < f/r_1 < 0.25$$

$$|r_4/r_3| < 0.5$$

wherein:
 f represents the focal length of the whole lens system;
 $r_1$ represents the paraxial radius of curvature of the light source side aspherical surface of the first lens element;
 $r_3$ represents the radius of curvature of the light source side surface of the second lens element; and
 $r_4$ represents the radius of curvature of the disk side surface of the second lens element.

3 Claims, 6 Drawing Sheets

OBJECTIVE LENS SYSTEM FOR OPTICAL RECORDING AND READING DEVICE

BACKGROUND OF THE INVENTION

1. Field of the Invention

The present invention relates to an objective lens system for a device for optically recording and reading digitalized information on an optical disk which is utilized as a document file or the like.

2. Description of the Prior Art

In case of recording the information on the disk, a more intensive light energy is required than the case of reading the information. Therefore, not only the numerical aperture, NA on the disk side but also that the numerical aperture NA' on the light source side should be increased in comparison with the case of an objective lens for exclusive use of reading the information. An increase of the magnification, $\beta(=NA'/NA)$ of the objective lens system may suit the above purpose. As magnification becomes greater, however, an angle of incidence becomes so greater as to cause both spherical aberration and coma which are difficult to be corrected well. An attempt to correct such aberrations with a combination of only spherical lens elements would necessitate a greater number of lens elements forming the objective lens system with its size and weight inevitably increased.

Japanese patent applications laid open Nos. 58-211729, 57-154213 and 59-157607 are cited to show prior art objective lens systems in this field of art.

SUMMARY OF THE INVENTION

An object of the present invention is to provide an improved objective lens system for an optical recording and reading device.

Another object of the present invention is to provide an objective lens system that is available for both recording and reading the information.

Still another object of the present invention is to provide such an objective lens system with one aspherical lens element and two spherical lens elements.

Further object of the present invention is to provide an objective lens system of the above mentioned type which has a great numerical aperture with the aberrations well corrected over its full image height (such as $y'=0.2$), for all its increased magnification (such as $|\beta| \geq 0.37$)

Still further object of the present invention is to provide the objective lens system with a compact size and a light weight.

According to the present invention, an objective lens system for optical recording and reading device, comprises from a light source side to a disk side, a first lens element having a positive refractive power, said first lens element having an aspherical surface on the light source side, a second lens element having a positive refractive power, and a third lens element having a positive refractive power, wherein the objective lens system fulfills the following conditions:

$$-0.3 < f/r_1 < 0.25$$

$$|r_4/r_3| < 0.5$$

wherein f represents the focal length of the whole lens system; $r_1$ represents the paraxial radius of curvature of the light source side aspherical surface of the first lens element; $r_3$ represents the radius of curvature of the light source side surface of the second lens element and $r_4$ represents the radius of curvature of the disk side surface of the second lens element.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DETAILED DESCRIPTION OF THE PREFERRED EMBODIMENTS

The following description is provided to enable any person skilled in the optical field to make and use the invention and sets forth the best modes contemplated by the inventor for carrying out my invention. Various modifications, however, will remain readily apparent to those skilled in the art, since the generic principles of the present invention have been defined herein specifically to provide a relatively economical and easily manufactured objective lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system.

In the drawings, schematic cross sectional views disclose the position of the lens elements. Values of the radii of curvature and axial distances for each lens element and air space are provided in the accompanying tables set forth herein. The schematic cross sectional views of the respective embodiments follow the normal conventions of the light source at the left-hand side of the drawing and the disk at the right hand side.

Figure 1:
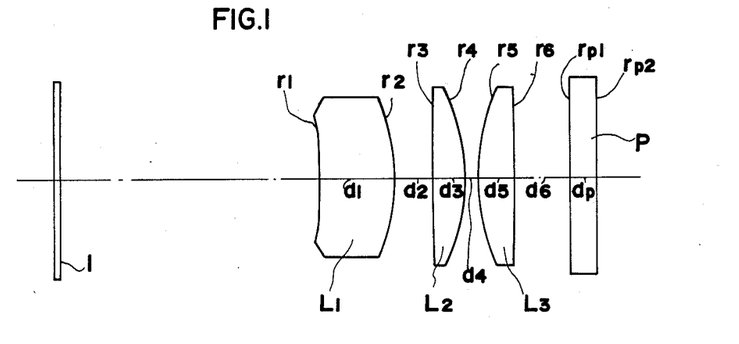
FIG. 1 represents a cross sectional view of the objective lens system according to embodiment 1 of the present invention.
Figure 2:
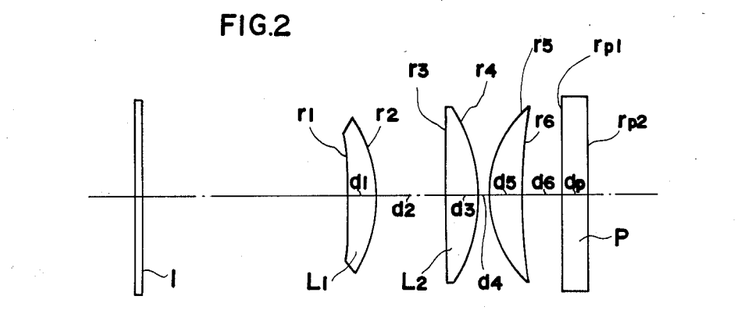
FIG. 2 represents a cross sectional view of the objective lens system according to embodiments 2, 3, 4, 8, 10 of the present invention.
Figure 3:
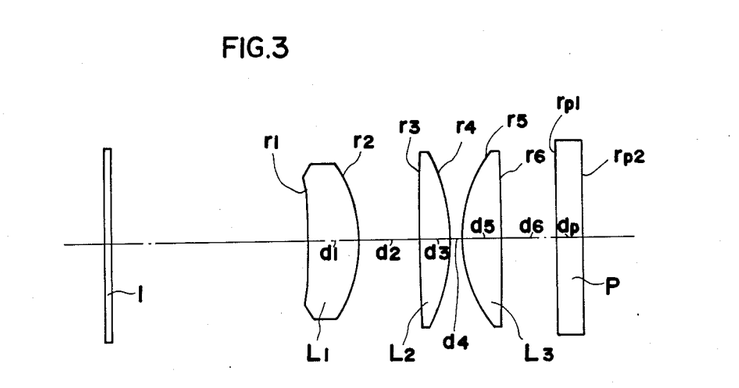
FIG. 3 represents a cross sectional view of the objective lens system according to embodiments 5, 6, 7, 9, 11, 12, 13, 14, 15 of the present invention.
Figure 4A:
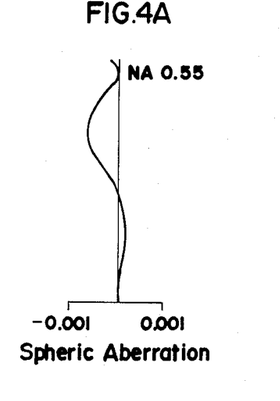
FIGS. 4A to 4C represent the aberration curves of the embodiment 1.
Figure 4B:
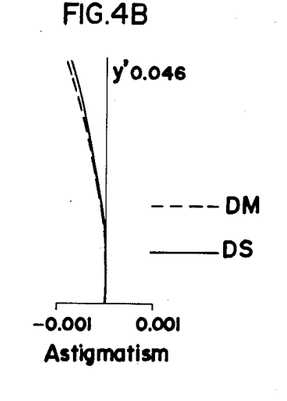
Figure 4C:
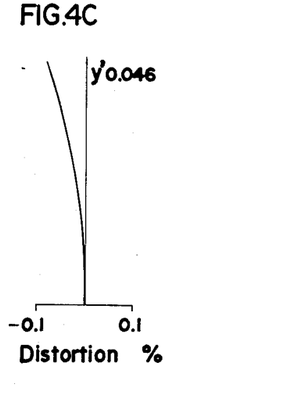
Figure 5A:
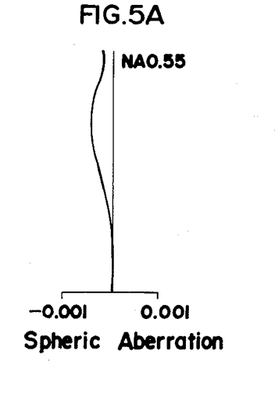
FIGS. 5A to 5C represent the aberration curves of the embodiment 2.
Figure 5B:
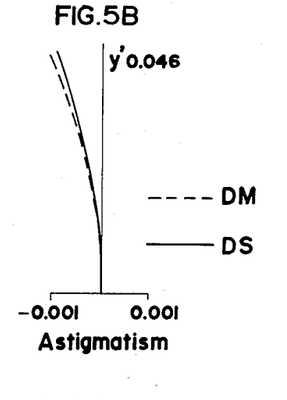
Figure 5C:
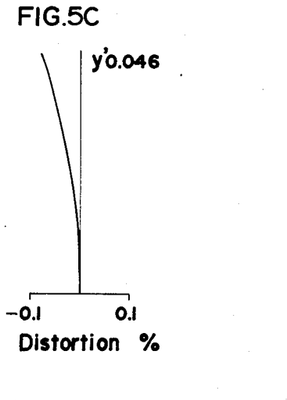
Figure 6A:
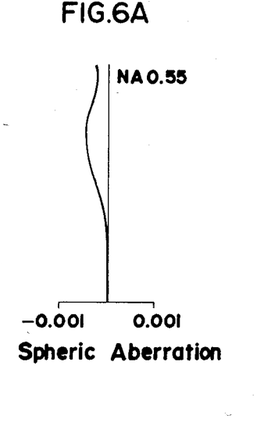
FIGS. 6A to 6C represent the aberration curves of the embodiment 3.
Figure 6B:
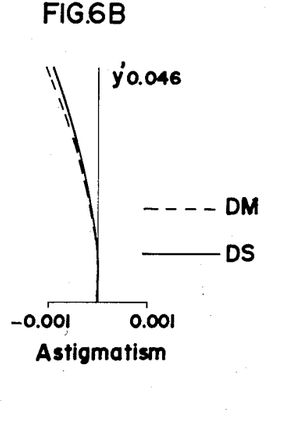
Figure 6C:
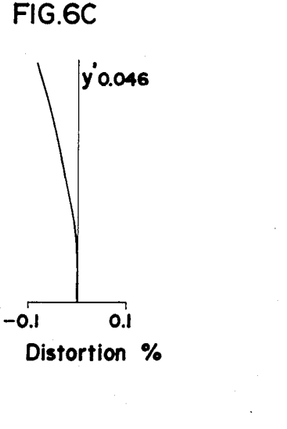
Figure 7A:
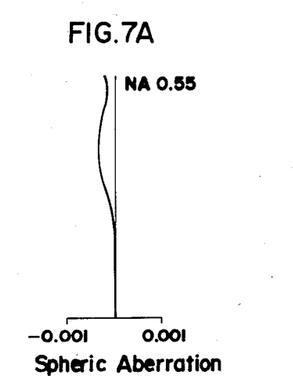
FIGS. 7A to 7C represent the aberration curves of the embodiment 4.
Figure 7B:
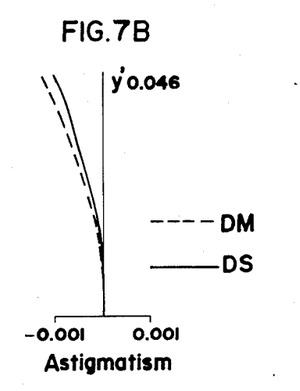
Figure 7C:
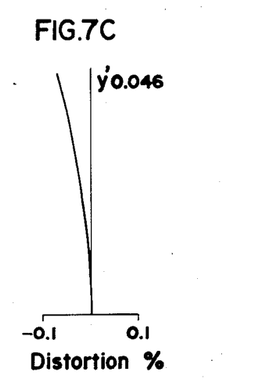
Figure 8A:
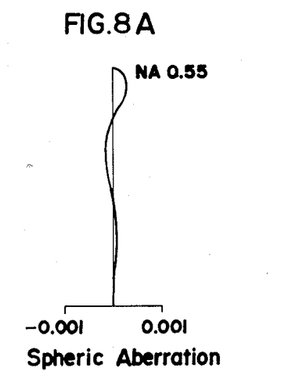
FIGS. 8A to 8C represent the aberration curves of the embodiment 5.
Figure 8B:
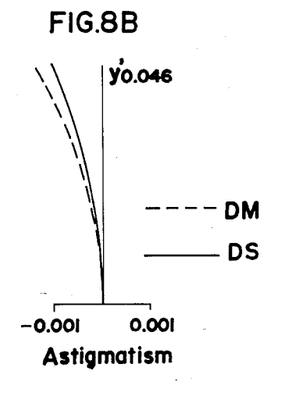
Figure 8C:
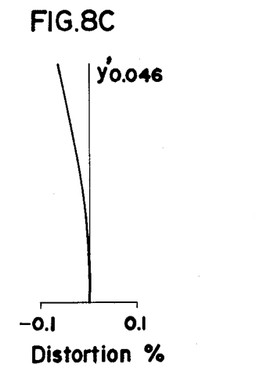
Figure 9A:
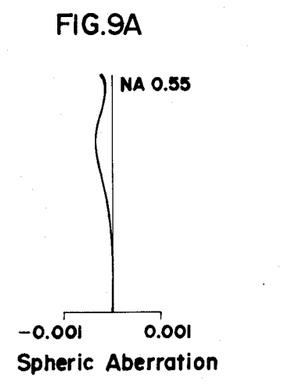
FIGS. 9A to 9C represent the aberration curves of the embodiment 6.
Figure 9B:
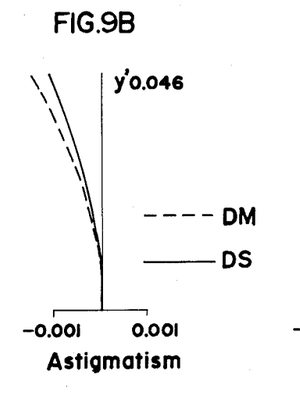
Figure 9C:
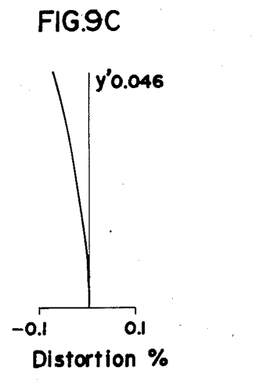
Figure 10A:
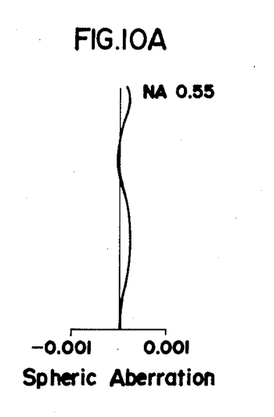
FIGS. 10A to 10C represent the aberration curves of the embodiment 7.
Figure 10B:
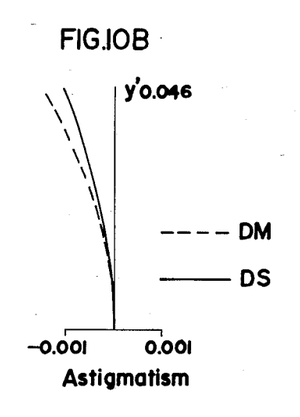
Figure 10C:
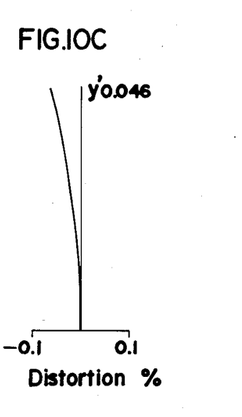
Figure 11A:
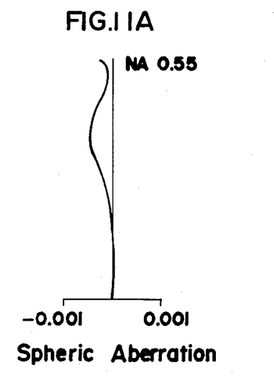
FIGS. 11A to 11C represent the aberration curves of the embodiment 8.
Figure 11B:
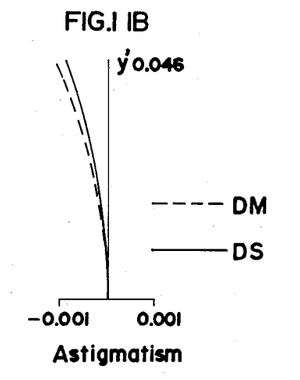
Figure 11C:
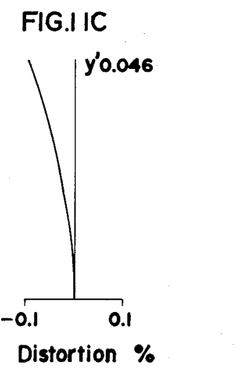
Figure 12A:
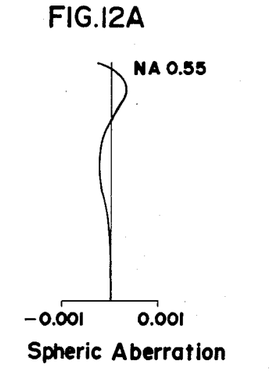
FIGS. 12A to 12C represent the aberration curves of the embodiment 9.
Figure 12B:
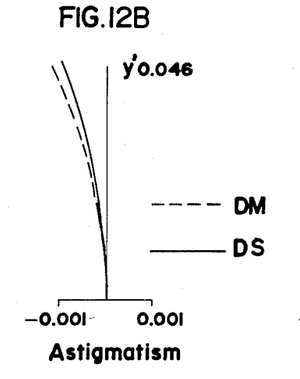
Figure 12C:
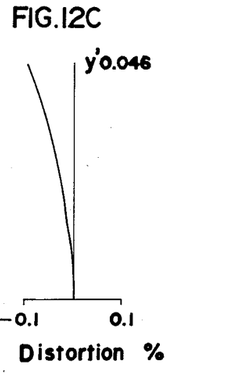
Figure 13A:
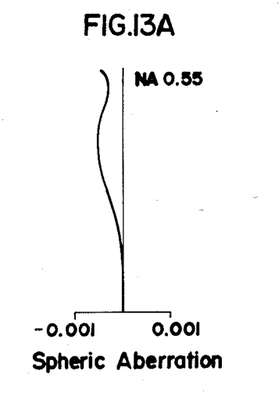
FIGS. 13A to 13C represent the aberration curves of the embodiment 10.
Figure 13B:
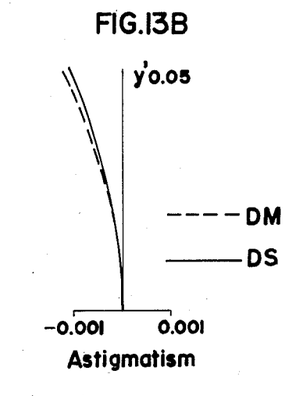
Figure 13C:
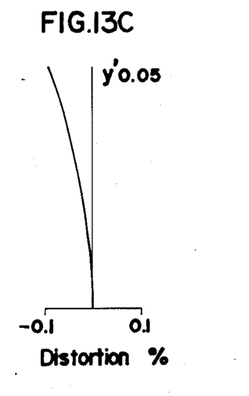
Figure 14A:
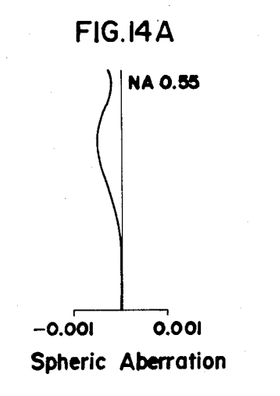
FIGS. 14A to 14C represent the aberration curves of the embodiment 11.
Figure 14B:
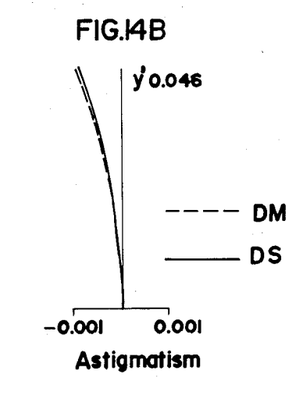
Figure 14C:
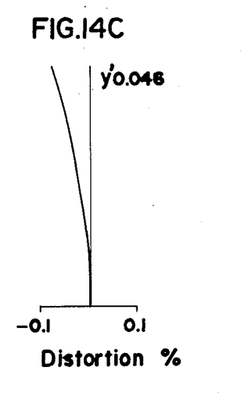
Figure 15A:
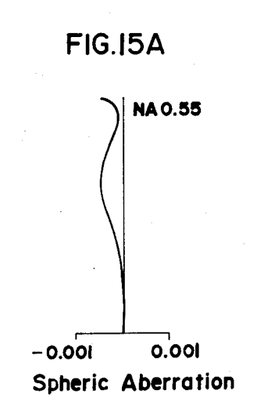
FIGS. 15A to 15C represent the aberration curves of the embodiment 12.
Figure 15B:
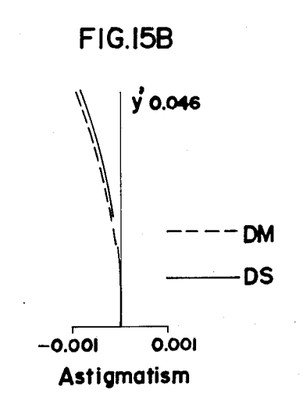
Figure 15C:
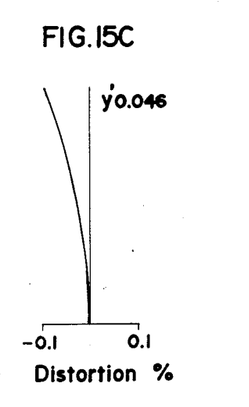
Figure 16A:
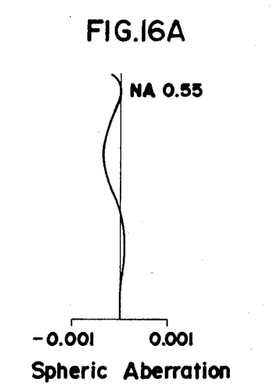
FIGS. 16A to 16C represent the aberration curves of the embodiment 13.
Figure 16B:
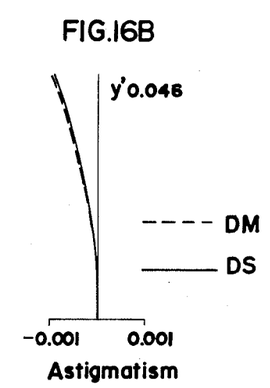
Figure 16C:
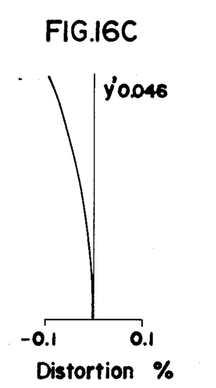
Figure 17A:
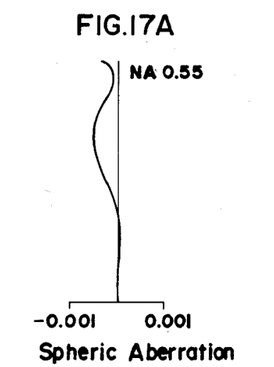
FIGS. 17A to 17C represent the aberration curves of the embodiment 14.
Figure 17B:
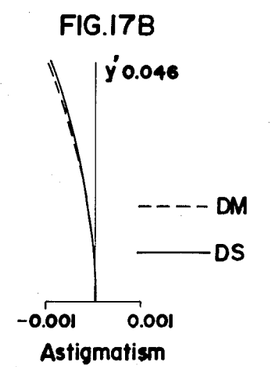
Figure 17C:
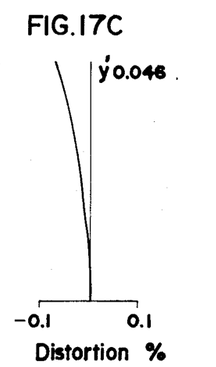
Figure 18A:
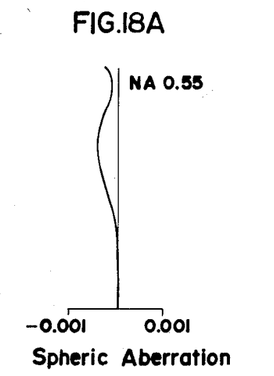
FIGS. 18A to 18C represent the aberration curves of the embodiment 15.
Figure 18B:
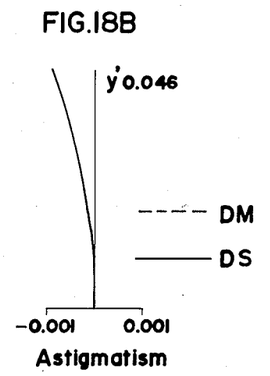
Figure 18C:
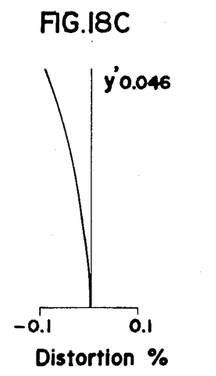

As shown in FIGS. 1, 2, 3, which show the objective lens system according to the present invention along with the cover glass(1) of the semiconductor laser and the cover glass(P) of the laser disk, the present invention provides the objective lens system available for optically recording and reading information on an optically disk, comprising from the light source side to the disk side, a first lens element ($L_1$) having a positive refractive power, said first lens element($L_1$) having a aspherical surface on the light source side, a second lens element($L_2$) having a positive refractive power, and a third lens element($L_3$) having a positive refractive power, in which the objective lens system fulfills the following conditions:

$$-0.3 < f/r_1 < 0.25 \quad (1)$$

$$|r_4/r_3| < 0.5 \quad (2)$$

wherein, f represents the focal length of the whole lens system, $r_1$ represents the paraxial radius of curvature of the light source side aspherical surface of the first lens element, $r_3$ represents the radius of curvature of the light source side surface of the second lens element and $r_4$ represents the radius of curvature of the disk side surface of the second lens element.

As is already explained, the magnification (=NA'/NA) of the objective lens system should become greater in order to increase the numerical aperture NA' on the light source side. This makes the angle of ray incidence to the objective lens system too large, which causes spheric aberration and coma. Although the spherical aberration may be corrected by means of an aspherical surface, the coma cannot be corrected well even with other spherical surfaces when the absolute value of the paraxial radius ($r_1$) of curvature of the light source side of the first lens element($L_1$) is made excessively small. In order to correct the coma the condition (1) limits the paraxial radius ($r_1$) of curvature of the light source side of the first lens ($L_1$). If the absolute value of the paraxial radius($r_1$) of curvature of the light source side of the first lens ($L_1$) becomes small to an extent violating the lower or upper limit of the condition (1), the coma cannot be corrected well, so that sufficient optical performance can be achieved only at a small image height.

The condition(2) defines the shape of the second lens element($L_2$) with positive power. If the absolute value of the radius of the curvature of the light source side surface ($r_3$) compared with that of the disk side surface ($r_4$) becomes smaller in the second lens element ($L_2$), the astigmatism is increasing and the working distance is decreasing. Although such an astigmatism may be theoretically corrected by both increasing the thickness ($d_1$) of the first lens element and widening the air space ($d_2$) between the first and the second lens elements, this approach would fail to maintain the necessary working distance.

In addition to the above conditions, it is recommended to fulfill the following conditions:

$$1.5 < f_3/f < 4.0 \quad (3)$$

$$-0.41 \leq f_1/r_1 \leq 0.41 \quad (4)$$

wherein, $f_3$ represents the focal length of the third lens element($L_3$) and $f_1$ represents the focal length of the first lens element($L_1$).

The condition (3) defines the positive refractive power of the third lens element($L_3$). If the positive refractive power of the third lens element ($L_3$) becomes great beyond the lower limit of the condition (3), the working distance becomes too short. On the other hand, if the positive refractive power becomes weak beyond the upper limit of the condition (3), the positive refractive power of the first lens element($L_1$) and the second lens element ($L_2$) have to become too strong for the coma to be satisfactorily corrected.

Furthermore, the condition(4) is to prevent the absolute value of the power for the light source side surface ($r_1$) from excessively increasing in comparison with the power for the first lens element($L_1$). If the power of the light source side of the first lens element($L_1$) becomes great and positive beyond the upper limit of condition (4), the coma is generated, which is not corrected easily. On the other hand, if the power of the light source side of the first lens element ($L_1$) becomes great and negative beyond the lower limit of the condition (4), the first lens element ($L_1$) becomes a meniscus lens element with a small radius of curvature, and the astigmatism is generated, which cannot be corrected well. The following tables 1 to 15 disclose, respectively, design parameters of the first through fifteenth embodiments of the present invention. In the tables, f equals the focal length of the whole lens system, r is the radius of curvature with respective sub numbers indicating the surface of the lens elements from the light source side along the optical axis, $r_{p1}$ and $r_{p2}$ are the radius of curvature of the light source side and disk side of the cover glass(P) of the disk, $d_1$ to $d_5$ represent the axial distance including both air spaces and the actual thickness of the lenses, $d_p$ represents the thickness of the cover glass(P) of the disk, and finally $N_1$, $N_2$, $N_3$, and $N_p$ represent respectively the refractive index of the first lens element($L_1$), the second lens element($L_2$), the third lens element($L_3$) and the cover glass(P) at the wavelength $\lambda = 870$ nm. The asterisk(*) represents the aspherical surface defined as follows, and values for coefficients appearing in the formula are shown at the bottom of respective tables:

$$x = \frac{Coh^2}{1 + \sqrt{1 - \epsilon Coh^2}} + \Sigma C_i h^{2i} \ (i = 1,2,3,\ldots m) \ .$$

wherein, x represents the coordinate along the optical axis measured from an imaginary plane tangent to the aspherical surface perpendicularly to the optical axis, h represents the coordinate perpendicular to the optical axis measured from the optical axis, Co represents paraxial curvature ($1/r_1$) of the light source side surface of the first lens($L_1$), $\epsilon$ represents the quadratic surface coefficient and $C_i$ represent the aspherical surface coefficients. Furthermore, NA represents the numerical aperture of the objective lens system, and $\beta$ represents the magnification.

Among the following embodiments, it should be noted that the paraxial curvature ($C_0 = 1/r_1$) of the aspherical surface is zero in the first to third embodiments. This is favorable to a test or measurement of the formed shape of the aspherical surface in manufacturing, since the paraxial curvature can be left out of consideration.

TABLE 1

[Embodiment 1]
$NA = 0.55\quad f = 1.0\quad \beta = -0.37$

| radius of curvature | axial distance | refractive index |
|---|---|---|
| $r_1^*\ \infty$ | | |
| | $d_1\ 0.784$ | $N_1\ 1.78866$ |
| $r_2\ -1.945$ | | |
| | $d_2\ 0.386$ | |
| $r_3\ 44.884$ | | |
| | $d_3\ 0.341$ | $N_2\ 1.78866$ |
| $r_4\ -1.947$ | | |
| | $d_4\ 0.114$ | |
| $r_5\ 2.088$ | | |
| | $d_5\ 0.386$ | $N_3\ 1.78866$ |
| $r_6\ -27.205$ | | |
| | $d_6\ 0.659$ | |
| $r_{p1}\ \infty$ | | |
| | $d_p\ 0.273$ | $N_p\ 1.56923$ |
| $r_{p2}\ \infty$ | | | aspheric surface coefficients $\epsilon = 1.0$ $C_1 = 0.0\quad C_2 = -0.22153\quad C_3 = -0.58226 \times 10^{-2}$
$C_4 = -0.20176\quad C_5 = -0.12423 \times 10^{-1}$
$f/r_1 = 0$
$|r_4/r_3| = 0.04$
$f_3/f = 2.47$
$f_1/r_1 = 0$

TABLE 2

[Embodiment 2]
$NA = 0.55\quad f = 1.0\quad \beta = -0.37$

| radius of curvature | axial distance | refractive index |
|---|---|---|
| $r_1^*\ \infty$ | | |
| | $d_1\ 0.341$ | $N_1\ 1.78866$ |
| $r_2\ -1.584$ | | |
| | $d_2\ 0.716$ | |
| $r_3\ \infty$ | | |
| | $d_3\ 0.341$ | $N_2\ 1.73009$ |
| $r_4\ -1.689$ | | |
| | $d_4\ 0.114$ | |
| $r_5\ 1.291$ | | |
| | $d_5\ 0.341$ | $N_3\ 1.78866$ |
| $r_6\ 13.370$ | | |
| | $d_6\ 0.464$ | |
| $r_{p1}\ \infty$ | | |
| | $d_p\ 0.273$ | $N_p\ 1.56923$ |
| $r_{p2}\ \infty$ | | | aspheric surface coefficients $\epsilon = 1.0$ $C_1 = 0.0\quad C_2 = -0.18414\quad C_3 = -0.37177 \times 10^{-2}$
$C_4 = -0.12311\quad C_5 = -0.27545 \times 10^{-1}$
$f/r_1 = 0$
$|r_4/r_3| = 0$
$f_3/f = 1.79$
$f_1/r_1 = 0$

TABLE 3

[Embodiment 3]
$NA = 0.55\quad f = 1.0\quad \beta = -0.37$

| radius of curvature | axial distance | refractive index |
|---|---|---|
| $r_1^*\ \infty$ | | |
| | $d_1\ 0.341$ | $N_1\ 1.78866$ |

TABLE 3-continued

[Embodiment 3]
$NA = 0.55\quad f = 1.0\quad \beta = -0.37$

| radius of curvature | axial distance | refractive index |
|---|---|---|
| $r_2\ -1.566$ | | |
| | $d_2\ 0.716$ | |
| $r_3\ \infty$ | | |
| | $d_3\ 0.341$ | $N_2\ 1.70433$ |
| $r_4\ -1.658$ | | |
| | $d_4\ 0.114$ | |
| $r_5\ 1.271$ | | |
| | $d_5\ 0.341$ | $N_3\ 1.78866$ |
| $r_6\ 13.703$ | | |
| | $d_6\ 0.455$ | |
| $r_{p1}\ \infty$ | | |
| | $d_p\ 0.273$ | $N_p\ 1.56923$ |
| $r_{p2}\ \infty$ | | | aspheric surface coefficients $\epsilon = 1.0$ $C_1 = 0.0\quad C_2 = -0.18466\quad C_3 = -0.35226 \times 10^{-2}$
$C_4 = -0.12227\quad C_5 = -0.27499 \times 10^{-1}$
$f/r_1 = 0$
$|r_4/r_3| = 0$
$f_3/f = 1.76$
$f_1/r_1 = 0$

TABLE 4

[Embodiment 4]
$NA = 0.55\quad f = 1.0\quad \beta = -0.45$

| radius of curvature | axial distance | refractive index |
|---|---|---|
| $r_1^*\ 9.574$ | | |
| | $d_1\ 0.318$ | $N_1\ 1.78866$ |
| $r_2\ -1.537$ | | |
| | $d_2\ 0.705$ | |
| $r_3\ 28.882$ | | |
| | $d_3\ 0.341$ | $N_2\ 1.71000$ |
| $r_4\ -1.634$ | | |
| | $d_4\ 0.114$ | |
| $r_5\ 1.268$ | | |
| | $d_5\ 0.341$ | $N_3\ 1.78866$ |
| $r_6\ 5.895$ | | |
| | $d_6\ 0.441$ | |
| $r_{p1}\ \infty$ | | |
| | $d_p\ 0.273$ | $N_p\ 1.56923$ |
| $r_{p2}\ \infty$ | | | aspheric surface coefficients $\epsilon = 1.0$ $C_1 = 0\quad C_2 = -0.19185\quad C_3 = 0.23537 \times 10^{-1}$
$C_4 = -0.10565\quad C_5 = -0.23430 \times 10^{-1}$
$f/r_1 = 0.1$
$|r_4/r_3| = 0.06$
$f_3/f = 1.98$
$f_1/r_1 = 0.18$

TABLE 5

[Embodiment 5]
$NA = 0.55\quad f = 1.0\quad \beta = -0.55$

| radius of curvature | axial distance | refractive index |
|---|---|---|
| $r_1^*\ 6.308$ | | |
| | $d_1\ 0.500$ | $N_1\ 1.78866$ |
| $r_2\ -1.457$ | | |
| | $d_2\ 0.636$ | |
| $r_3\ 49.422$ | | |
| | $d_3\ 0.341$ | $N_2\ 1.70000$ |
| $r_4\ -1.661$ | | |
| | $d_4\ 0.114$ | |
| $r_5\ 1.288$ | | |
| | $d_5\ 0.341$ | $N_3\ 1.78866$ |
| $r_6\ 3.064$ | | |
| | $d_6\ 0.500$ | |
| $r_{p1}\ \infty$ | | |
| | $d_p\ 0.273$ | $N_p\ 1.56923$ |
| $r_{p2}\ \infty$ | | | aspheric surface coefficients $\epsilon = 1.0$ $C_1 = 0\quad C_2 = -0.21793\quad C_3 = 0.39242 \times 10^{-1}$

TABLE 5-continued

[Embodiment 5]
NA = 0.55  f = 1.0  β = −0.55

$C_4 = -0.77439 \times 10^{-1}$   $C_5 = -0.43870 \times 10^{-1}$
$f/r_1 = 0.16$
$|r_4/r_3| = 0.03$
$f_3/f = 2.59$
$f_1/r_1 = 0.24$

TABLE 6

[Embodiment 6]
NA = 0.55  f = 1.0  β = −0.50

| radius of curvature | axial distance | refractive index |
|---|---|---|
| $r_1^*$ 9.828 | | |
| | $d_1$ 0.318 | $N_1$ 1.78866 |
| $r_2$ −1.502 | | |
| | $d_2$ 0.705 | |
| $r_3$ 21.362 | | |
| | $d_3$ 0.341 | $N_2$ 1.70000 |
| $r_4$ −1.640 | | |
| | $d_4$ 0.114 | |
| $r_5$ 1.239 | | |
| | $d_5$ 0.341 | $N_3$ 1.78866 |
| $r_6$ 4.498 | | |
| | $d_6$ 0.477 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$   $C_2 = -0.19223$   $C_3 = 0.28266 \times 10^{-1}$
$C_4 = -0.89550 \times 10^{-1}$   $C_5 = -0.43669 \times 10^{-1}$
$f/r_1 = 0.10$
$|r_4/r_3| = 0.08$
$f_3/f = 2.07$
$f_1/r_1 = 0.17$

TABLE 7

[Embodiment 7]
NA = 0.55  f = 1.0  β = −0.55

| radius of curvature | axial distance | refractive index |
|---|---|---|
| $r_1^*$ 6.532 | | |
| | $d_1$ 0.409 | $N_1$ 1.78866 |
| $r_2$ −1.489 | | |
| | $d_2$ 0.659 | |
| $r_3$ 31.805 | | |
| | $d_3$ 0.341 | $N_2$ 1.70000 |
| $r_4$ −1.648 | | |
| | $d_4$ 0.114 | |
| $r_5$ 1.275 | | |
| | $d_5$ 0.341 | $N_3$ 1.78866 |
| $r_6$ 3.327 | | |
| | $d_6$ 0.500 | |
| $r_{p1}$ ∞ | | |
| | $d_p$ 0.273 | $N_p$ 1.56923 |
| $r_{p1}$ ∞ | | | aspheric surface coefficients ε = 1.0

$C_1 = 0$   $C_2 = -0.20542$   $C_3 = 0.47882 \times 10^{-1}$
$C_4 = -0.86333 \times 10^{-1}$   $C_5 = -0.43779 \times 10^{-1}$
$f/r_1 = 0.15$
$|r_4/r_3| = 0.05$
$f_3/f = 2.44$
$f_1/r_1 = 0.24$

TABLE 8

[Embodiment 8]
NA = 0.55  f = 1.0  β = −0.37

| radius of curvature | axial distance | refractive index |
|---|---|---|
| $r_1^*$ −11.364 | | |
| | $d_1$ 0.341 | $N_1$ 1.78866 |
| $r_2$ −1.654 | | |
| | $d_2$ 0.659 | |
| $r_3$ −16.624 | | |
| | $d_3$ 0.341 | $N_2$ 1.73009 |
| $r_4$ −1.636 | | |
| | $d_4$ 0.114 | |
| $r_5$ 1.428 | | |
| | $d_5$ 0.341 | $N_3$ 1.78866 |
| $r_6$ 10.060 | | |
| | $d_6$ 0.591 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$   $C_2 = -0.19120$   $C_3 = -0.13389 \times 10^{-1}$
$C_4 = -0.18165$   $C_5 = -0.30203 \times 10^{-1}$
$f/r_1 = -0.09$
$|r_4/r_3| = 0.10$
$f_3/f = 1.83$
$f_1/r_1 = 0.21$

TABLE 9

[Embodiment 9]
NA = 0.55  f = 1.0  β = −0.52

| radius of curvature | axial distance | refractive index |
|---|---|---|
| $r_1^*$ 8.677 | | |
| | $d_1$ 0.648 | $N_1$ 1.58000 |
| $r_2$ −1.211 | | |
| | $d_2$ 0.591 | |
| $r_3$ 10.256 | | |
| | $d_3$ 0.341 | $N_2$ 1.68000 |
| $r_4$ −1.849 | | |
| | $d_4$ 0.114 | |
| $r_5$ 1.325 | | |
| | $d_5$ 0.386 | $N_3$ 1.76000 |
| $r_6$ 4.921 | | |
| | $d_6$ 0.570 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$   $C_2 = -0.35020$   $C_3 = 0.46926 \times 10^{-1}$
$C_4 = -0.21665$   $C_5 = -0.23700 \times 10^{-1}$
$f/r_1 = 0.12$
$|r_4/r_3| = 0.18$
$f_3/f = 2.28$
$f_1/r_1 = 0.22$

TABLE 10

[Embodiment 10]
NA = 0.55  f = 1.0  β = −0.37

| radius of curvature | axial distance | refractive index |
|---|---|---|
| $r_1^*$ −57.156 | | |
| | $d_1$ 0.375 | $N_1$ 1.78866 |
| $r_2$ −1.509 | | |
| | $d_2$ 0.675 | |
| $r_3$ 31.767 | | |
| | $d_3$ 0.350 | $N_2$ 1.70000 |
| $r_4$ −1.675 | | |
| | $d_4$ 0.125 | |
| $r_5$ 1.433 | | |
| | $d_5$ 0.386 | $N_3$ 1.78866 |
| $r_6$ 32.750 | | |
| | $d_6$ 0.418 | |
| $r_{p1}$ ∞ | | |
| | $d_p$ 0.300 | $N_p$ 1.56923 |
| $r_{p2}$ ∞ | | | aspheric surface coefficients ε = 1.0

$C_1 = 0$   $C_2 = -0.19387$   $C_3 = -0.24468 \times 10^{-2}$

TABLE 10-continued

[Embodiment 10]
NA = 0.55  f = 1.0  β = −0.37

$C_4 = -0.13200$  $C_5 = -0.21165 \times 10^{-1}$
$f/r_1 = -0.02$
$|r_4/r_3| = 0.05$
$f_3/f = 1.89$
$f_1/r_1 = 0.03$

TABLE 11

[Embodiment 11]
NA = 0.55  f = 1.0  β = −0.37

| radius of curvature | axial distance | refractive index |
|---|---|---|
| $r_1$* 82.944 | | |
| | $d_1$ 0.636 | $N_1$ 1.78866 |
| $r_2$ −1.415 | | |
| | $d_2$ 0.522 | |
| $r_3$ 42.161 | | |
| | $d_3$ 0.341 | $N_2$ 1.48135 |
| $r_4$ −1.575 | | |
| | $d_4$ 0.114 | |
| $r_5$ 1.662 | | |
| | $d_5$ 0.386 | $N_3$ 1.78866 |
| $r_6$ −9.321 | | |
| | $d_6$ 0.455 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$  $C_2 = -0.23832$  $C_3 = -0.87594 \times 10^{-2}$
$C_4 = -0.11755$  $C_5 = -0.21020 \times 10^{-1}$
$f/r_1 = 0.01$
$|r_4/r_3| = 0.04$
$f_3/f = 1.82$
$f_1/r_1 = 0.02$

TABLE 12

[Embodiment 12]
NA = 0.55  f = 1.0  β = −0.37

| radius of curvature | axial distance | refractive index |
|---|---|---|
| $r_1$* 7.438 | | |
| | $d_1$ 0.500 | $N_1$ 1.48135 |
| $r_2$ −1.403 | | |
| | $d_2$ 0.523 | |
| $r_3$ 86.655 | | |
| | $d_3$ 0.341 | $N_2$ 1.75000 |
| $r_4$ −1.837 | | |
| | $d_4$ 0.114 | |
| $r_5$ 1.597 | | |
| | $d_5$ 0.386 | $N_3$ 1.78866 |
| $r_6$ −33.185 | | |
| | $d_6$ 0.591 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$  $C_2 = -0.34037$  $C_3 = 0.56587 \times 10^{-2}$
$C_4 = -0.23482$  $C_5 = -0.24800 \times 10^{-1}$
$f/r_1 = 0.13$
$|r_4/r_3| = 0.02$
$f_3/f = 1.94$
$f_1/r_1 = 0.33$

TABLE 13

[Embodiment 13]
NA = 0.55  f = 1.0  β = −0.37

| radius of curvature | axial distance | refractive index |
|---|---|---|
| $r_1$* 5.483 | | |
| | $d_1$ 0.500 | $N_1$ 1.48135 |
| $r_2$ −1.246 | | |
| | $d_2$ 0.523 | |
| $r_3$ 9.466 | | |
| | $d_3$ 0.341 | $N_2$ 1.48135 |
| $r_4$ −1.484 | | |
| | $d_4$ 0.114 | |
| $r_5$ 1.401 | | |
| | $d_5$ 0.386 | $N_3$ 1.78866 |
| $r_6$ −36.428 | | |
| | $d_6$ 0.511 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$  $C_2 = -0.35560$  $C_3 = 0.30654 \times 10^{-1}$
$C_4 = 0.27703$  $C_5 = -0.26457 \times 10^{-1}$
$f/r_1 = 0.18$
$|r_4/r_3| = 0.16$
$f_3/f = 1.77$
$f_1/r_1 = 0.4$

TABLE 14

[Embodiment 14]
NA = 0.55  f = 1.0  β = −0.37

| radius of curvature | axial distance | refractive index |
|---|---|---|
| $r_1$* 42.659 | | |
| | $d_1$ 0.636 | $N_1$ 1.78866 |
| $r_2$ −1.350 | | |
| | $d_2$ 0.523 | |
| $r_3$ 38.564 | | |
| | $d_3$ 0.341 | $N_2$ 1.70000 |
| $r_4$ −1.765 | | |
| | $d_4$ 0.114 | |
| $r_5$ 1.598 | | |
| | $d_5$ 0.386 | $N_3$ 1.51000 |
| $r_6$ −5.462 | | |
| | $d_6$ 0.409 | |
| $r_{p1}$ ∞ | | |
| | $d_p$ 0.273 | $N_p$ 1.56923 |
| $r_{p1}$ ∞ | | | aspheric surface coefficients ε = 1.0

$C_1 = 0$  $C_2 = -0.26456$  $C_3 = -0.63330 \times 10^{-2}$
$C_4 = -0.13300$  $C_5 = -0.21656 \times 10^{-1}$
$f/r_1 = 0.02$
$|r_4/r_3| = 0.05$
$f_3/f = 2.47$
$f_1/r_1 = 0.04$

TABLE 15

[Embodiment 15]
NA = 0.55  f = 1.0  β = −0.37

| radius of curvature | axial distance | refractive index |
|---|---|---|
| $r_1$* 11.904 | | |
| | $d_1$ 0.545 | $N_1$ 1.58000 |
| $r_2$ −1.325 | | |
| | $d_2$ 0.591 | |
| $r_3$ 17.779 | | |
| | $d_3$ 0.341 | $N_2$ 1.68000 |
| $r_4$ −1.783 | | |
| | $d_4$ 0.114 | |
| $r_5$ 1.449 | | |
| | $d_5$ 0.386 | $N_3$ 1.76000 |
| $r_6$ 68.973 | | |
| | $d_6$ 0.489 | |
| $r_{p1}$ ∞ | | |
| | $d_p$ 0.273 | $N_p$ 1.56923 |
| $r_{p2}$ ∞ | | | aspheric surface coefficients ε = 1.0

$C_1 = 0$  $C_2 = -0.30006$  $C_3 = 0.10981 \times 10^{-2}$

TABLE 15-continued

[Embodiment 15]
NA = 0.55   f = 1.0   β = −0.37

$C_4 = -0.19225$   $C_5 = -0.22984 \times 10^{-1}$
$f/r_1 = 0.08$
$|r_4/r_3| = 0.1$
$f_3/f = 1.94$
$f_1/r_1 = 0.18$

What is claimed is:

1. An objective lens system for a device for optically recording and reading digital data on an optical disk, comprising from a light source side to a disk side,
   a first lens element having a positive refractive power, said first lens element having an aspherical surface on the light source side;
   a second lens element having a positive refractive power; and
   a third lens element having a positive refractive power, wherein the objective lens system fulfills the following conditions:

$$-0.3 < f/r_1 < 0.25$$

$$|r_4/r_3| < 0.5$$

wherein:
   f represents the focal length of the whole lens system;
   $r_1$ represents the paraxial radius of curvature of the light source side aspherical surface of the first lens element,
   $r_3$ represents the radius of curvature of the light source side surface of the second lens element and
   $r_4$ represents the radius of curvature of the disk side surface of the second lens element.

2. An objective lens system as claimed in claim 1, wherein the objective lens system further fulfills the following conditions:

$$1.5 < f_3/f < 4.0$$

$$-0.41 \leq f_1/r_1 \leq 0.41$$

wherein:
   $f_3$ represents the focal length of the third lens element($L_3$) and
   $f_1$ represents the focal length of the first lens element($L_1$).

3. An objective lens system for a device for optically recording and reading digital data on an optical disk, comprising the following design parameters:

| NA= 0.55   f = 1.0   β = −0.37 | | |
|---|---|---|
| radius of curvature | axial distance | refractive index |
| $r_1$* ∞ | | |
| | $d_1$ 0.784 | $N_1$ 1.78866 |
| $r_2$ −1.945 | | |
| | $d_2$ 0.386 | |
| $r_3$ 44.884 | | |
| | $d_3$ 0.341 | $N_2$ 1.78866 |
| $r_4$ −1.947 | | |
| | $d_4$ 0.114 | |
| $r_5$ 2.088 | | |
| | $d_5$ 0.386 | $N_3$ 1.78866 |
| $r_6$ −27.205 | | |
| | $d_6$ 0.659 | |
| $r_{p1}$ ∞ | | |
| | $d_p$ 0.273 | $N_p$ 1.56923 |
| $r_{p2}$ ∞ | | |
| aspheric surface coefficients ε = 1.0 | | |
| $C_1 = 0.0$   $C_2 = -0.22153$   $C_3 = -0.58226 \times 10^{-2}$ | | |
| $C_4 = -0.20176$   $C_5 = -0.12423 \times 10^{-1}$ | | |
| $f/r_1 = 0$ | | |
| $|r_4/r_3| = 0.04$ | | |
| $f_3/f = 2.47$ | | |
| $f_1/r_1 = 0$ | | |

* * * * *